(12) United States Patent
chul (10) Patent No.: US 7,645,043 B2
(45) Date of Patent: Jan. 12, 2010

(54) OPTICAL ENGINE OF PROJECTION SYSTEM AND FABRICATING METHOD THEREOF

(75) Inventor: Lee Sang chul, Daegu-si (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 11/302,350

(22) Filed: Dec. 14, 2005

(65) Prior Publication Data

US 2007/0030461 A1 Feb. 8, 2007

(30) Foreign Application Priority Data

Aug. 5, 2005 (KR) .................. 10-2005-0071766

(51) Int. Cl.
G03B 21/22 (2006.01)
G03B 21/26 (2006.01)
H04N 5/64 (2006.01)

(52) U.S. Cl. .................... 353/119; 353/34; 353/82; 348/794

(58) Field of Classification Search ............... 353/119, 353/30, 31, 34, 37, 74, 76–79, 81, 82, 84, 353/122; 348/739, 744, 787, 789, 794, 836, 348/843; 345/905; 359/618, 629, 634, 636, 359/638–640
See application file for complete search history.

(56) References Cited

U.S. PATENT DOCUMENTS

RE38,306 E * 11/2003 Fujimori et al. ............. 353/119

2002/0130978 A1 * 9/2002 Menard ....................... 348/744
2003/0072012 A1 * 4/2003 Kitabayashi ................. 356/614
2003/0189694 A1 * 10/2003 Yamada et al. ................. 353/77

FOREIGN PATENT DOCUMENTS

CN 1444092 9/2003
KR 10-2003-0049835 A 6/2003

OTHER PUBLICATIONS

Korean Office Action dated Oct. 27, 2006.
Chinese Office Action, Dec. 28, 2007.

* cited by examiner

*Primary Examiner*—Rochelle-Ann J Blackman
(74) *Attorney, Agent, or Firm*—Ked & Associates LLP (57) ABSTRACT

There is provided an optical engine of a projection system comprising: a lamp irradiating light; an illumination unit provided with a plurality of lens through which the light is passed; a composition unit separating and composing the light to form an image signal; an engine base provided with the illumination unit and the composition unit on a top portion thereof; a reinforcing part which is made of a high intensity material and which is provided between the composition unit and the engine base to prevent a deformation of the composition unit; and a projection lens projecting light composed in the composition unit to the screen. Therefore, it is possible to stably embody a high definition image in the optical engine of the projection system.

20 Claims, 8 Drawing Sheets

OPTICAL ENGINE OF PROJECTION SYSTEM AND FABRICATING METHOD THEREOF

BACKGROUND OF THE INVENTION

1. Field of the Invention

The present invention relates to an optical engine of a projection system and a fabricating method thereof, and more particularly, to an optical engine of a projection system which can prevent non-matching of red, green, and blue color images by reinforcing the intensity of the optical engine of the projection system and a fabricating method thereof. More specifically, it relates to the an optical engine of a projection system which can improve the reliability of image matching by preventing a composition unit from moving by external force, and furthermore a relative position of a LCOS panel and a position of a quad and the like from moving through intercepting transmission of external force to a composition unit, and a fabricating method of the optical engine.

2. Description of the Background Art

Unlike a general liquid crystal display, a liquid crystal on silicon (hereinafter, referred to as "LCOS") that is a kind of a reflecting-type liquid crystal display forms a liquid crystal cell on a semiconductor substrate and can realize a high definition of a XGA grade or more in a small size of about one inch by arranging switching circuits and elements of each pixel in high integration.

For these reasons, the LCOS panel has been attracted as a display device of the projection system and technical development and commercialization of the LCOS panel and a projection display system using the LCOS panel have been actively progressed.

In order to embody a full color screen, the LCOS projection system uses a three panel type which converts white color light to RGB three color light, has three LCOS panels corresponding to the R, G, B light to compose R, G, B images embodied by each LCOS panel in a color image, and projects the composed image to a screen.

Such general LCOS projection system includes an illumination unit for projecting light, a composition unit for composing RGB three images displayed in the LCOS panel in an image after projecting light, a projecting lens for projecting light composed in the composition unit, and a screen for displaying light projected from the projecting lens to an image. Three LCOS panels are additionally fixed to the composition unit, after each of RGB three color light separated from white color light is incident to the LCOS panel, it is reflected and the reflected light is composed. A quarter-wave plate is provided in a neighboring position of the LCOS panel to improve a contrast of an image. The quarter-wave plate performs an operation converting linear polarized light to circular polarized light.

On the other hand, three LCOS panels are provided to compose RGB color light. In a case where the panel is a three panel type as described above, it is important that image matching between the respective LCOS panels is accurately performed. It is also important that image matching between the quater-wave plate and the LCOS panel is accurately performed.

In order to accurately perform the image matching, when the quad housing which is a single body and to which three color quads are attached to is provided, the LCOS panel assembly forming the quater-wave plate and the LCOS panel as a one piece are fastened to the quad housing. Thereafter, the LCOS panel assembly operates to adjust image matching.

Although the image matching is performed at a state where the LCOS panel assembly is coupled to the quad housing, there is a problem in that non-matching of an image may be generated when the quad housing is deformed during a process of coupling the quad housing to the optical engine. Therefore, there is a disadvantage in that an operator should perform the image matching once again, and this operation becomes an important problem in a manufacturing site. This problem may be also generated even when external shock is applied to the optical engine after manufacturing of the optical engine is completed.

Further, although the composition unit including the quad housing is made of a strong material, a shape of the composition unit and a coupled relation between parts may be deformed by continuous external force, and this problem frequently occurs as using time of the projection system is long. Therefore, as a use period of the projection system is prolonged, non-matching of an image is generated, whereby image quality is deteriorated or the durability of the projection system is deteriorated.

SUMMARY OF THE INVENTION

Accordingly, an object of the present invention is to solve at least the problems and disadvantages of the background art. An object of the present invention is to provide an optical engine of a projection system which can prevent deterioration of an image by maintaining an image matching state in semi-permanent after image matching of a LCOS panel assembly is once adjusted, and a fabricating method thereof.

Another object of the present invention is to provide an optical engine of a projection system which can conveniently perform a manufacturing operation and conveniently perform an assembling work of an optical engine by an operator by reinforcing the intensity of a quad housing constituting a frame of a composition unit, and a fabricating method thereof.

Still another object of the present invention is to provide an optical engine of a projection system which can improve the reliability for the product use and extend a normal use term of a projection system, and a fabricating method thereof.

To achieve these and other advantages and in accordance with the purpose of the present invention, as embodied and broadly described, there is provided an optical engine of a projection system comprising: a lamp irradiating light; an illumination unit provided with a plurality of lens through which the light is passed; a composition unit separating and composing the light to form an image signal; an engine base provided with the illumination unit and the composition unit on a top portion thereof; a reinforcing part which is made of a high intensity material and which is provided between the composition unit and the engine base to prevent deformation of the composition unit; and a projection lens projecting light composed in the composition unit to the screen.

According to another aspect of the present invention, there is provide an optical engine of a projection system comprising: a lamp irradiating light; an illumination unit provided with a plurality of lens through which the light is passed; a composition unit composing the light reflected from a LCOS panel to form an image signal; an engine case housing the illumination unit and the composition unit; an engine base provided with the engine case on a top surface thereof; a reinforcing part having high intensity which is additionally coupled to a lower part of the composition unit to reinforce the intensity of the composition unit; and a projection lens projecting light composed in the composition unit to the screen.

According to a further aspect of the present invention, there is provided a method of fabricating an optical engine of a projection system, the method comprising: manufacturing a composition unit by fixing an additional reinforcing part to a quad housing; and fixing the composition unit to an engine base side.

According to the present invention, there is an advantage that although a using time of the projection system is extended, the quality of an image is maintained in high quality, and image matching is maintained, and the reliability of a product against external shock is improved.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Hereinafter, a projection system and a LCOS panel assembly of the projection system according to the present invention will be described in detail with reference to the attached drawings.

Figure 1:
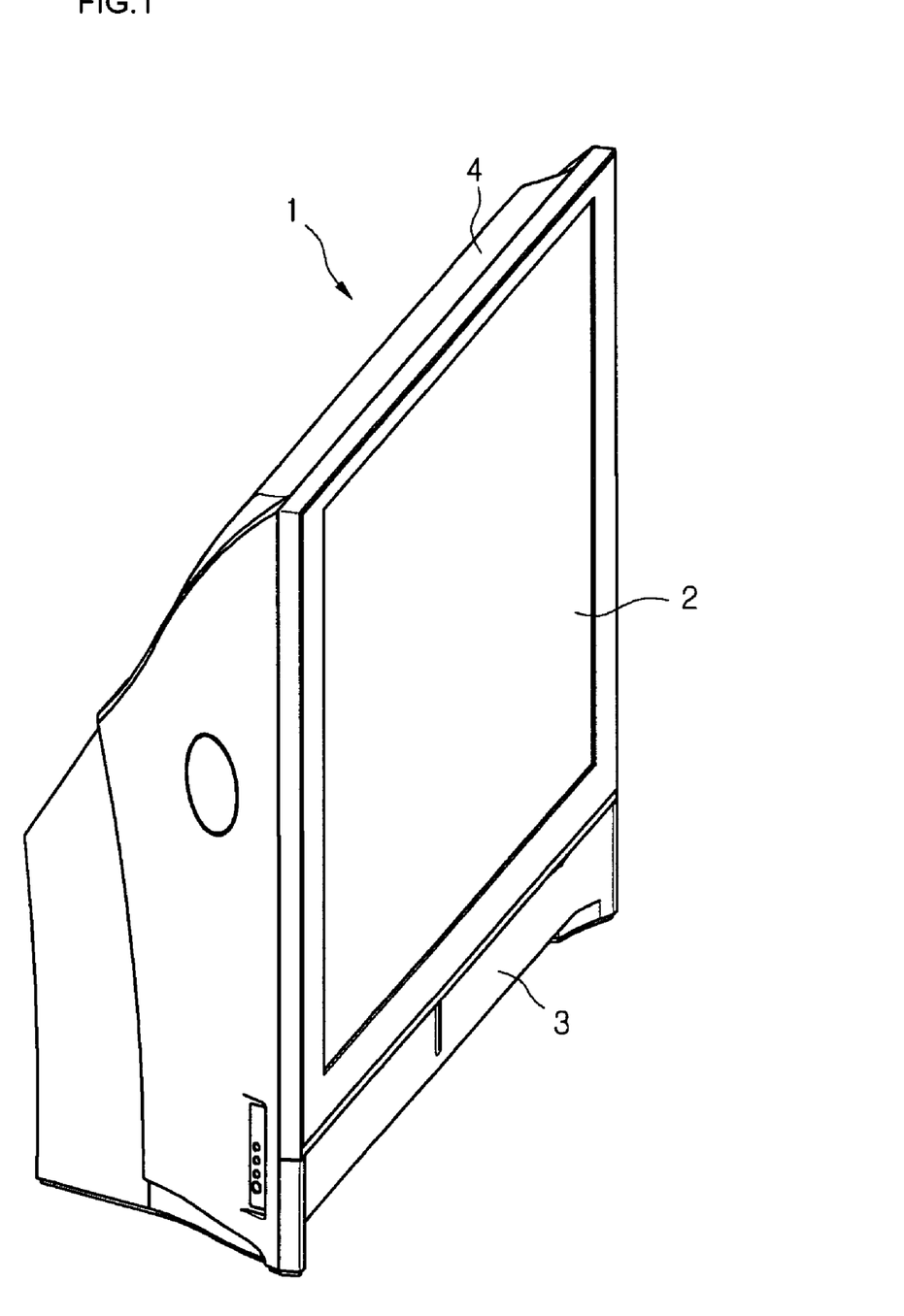
FIG. 1 is a perspective view of a projection system according to the present invention.
Figure 2:
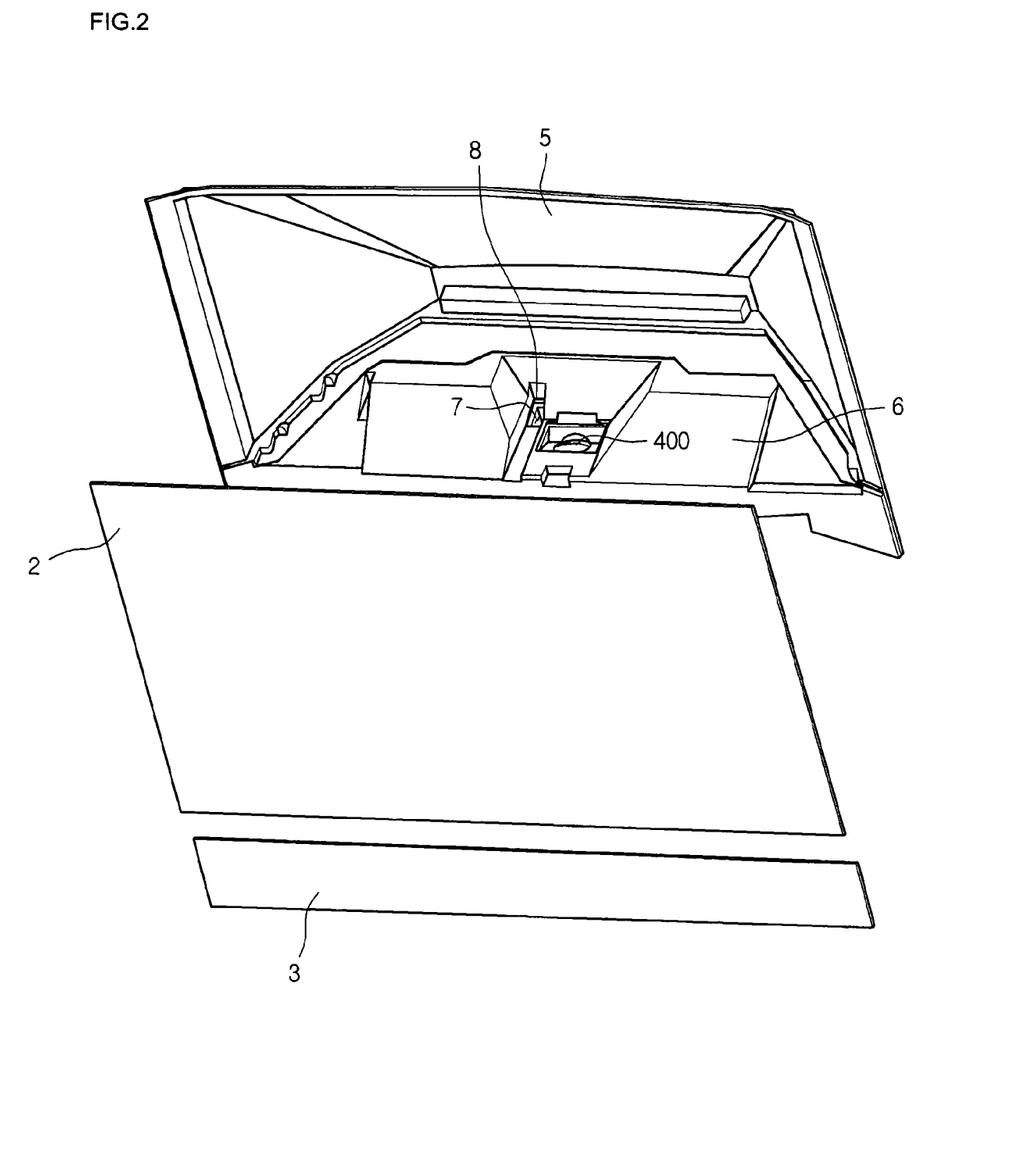
FIG. 2 is an exploded perspective view of a display of the projection system according to the present invention.

FIG. 1 is a perspective view of a projection system according to the present invention and FIG. 2 is an exploded perspective view of a display of the projection system according to the present invention.

Referring to the FIGS. 1 and 2, the projection system 1 according to the present includes a screen 2 displaying an image, a front pane 3 disposed in a lower side of the screen 2, and a back cover 4 disposed in the rear side of the screen.

Further, a division plate 6 which divides an optical engine (see 10 of FIG. 3) housing space and a light projecting space is provided in a space provided between the screen 2 and the back cover 4. A reflective mirror 5 is disposed at the inside of the back cover 4 to reflect the light which is projected from the optical engine 10 to the screen 2 and then display in the image.

Further, an opening portion 8 of the division plate 6 side for communication the optical engine housing space and the light projecting space is formed at the division plate 6. The opening portion 8 is aligned with an air injection port 7 which is a passage for injecting air to the inside of the optical engine 10 to inject inner air of the light projecting space to the optical engine 10. Air injected through the air injection port 7 is used to cool the optical engine 10.

In FIG. 2, reference numeral 400 indicates a projection lens for projecting light from the optical engine 10 and light emitted from the projection lens 400 is emitted toward a reflective mirror 5 and then is reflected to form an image on the screen 2.

Figure 3:
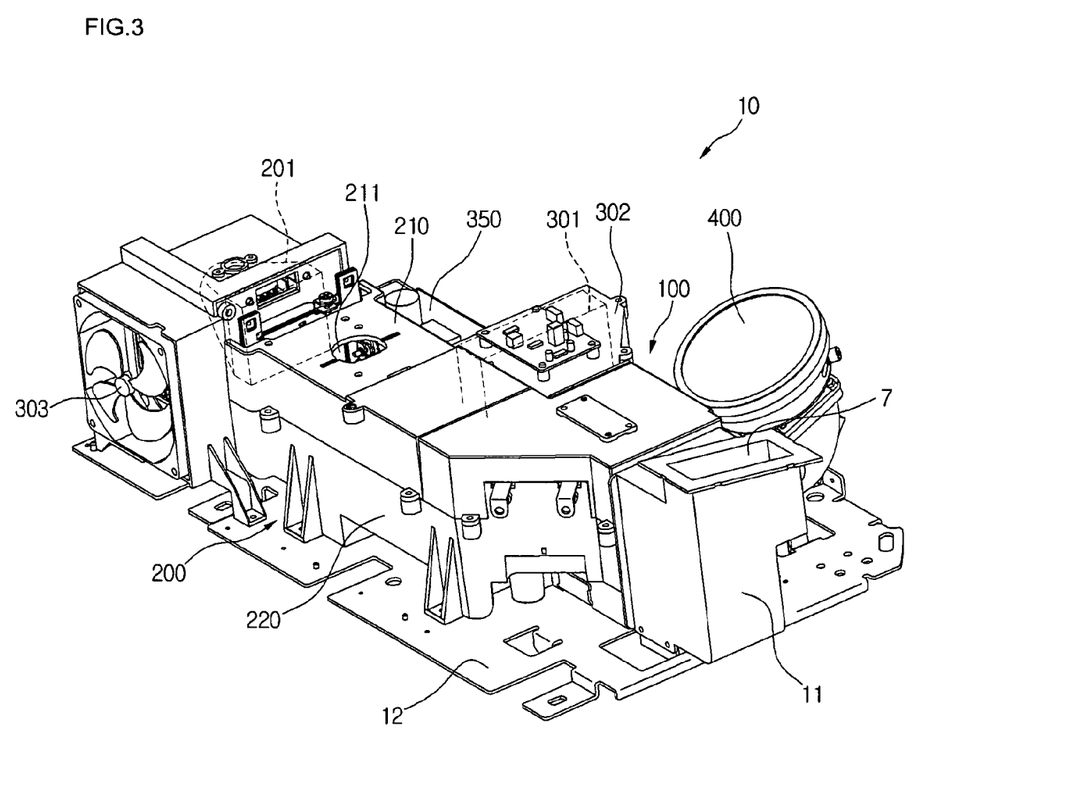
FIG. 3 is a perspective view of an optical engine of the projection system according to the present invention.
Figure 4:
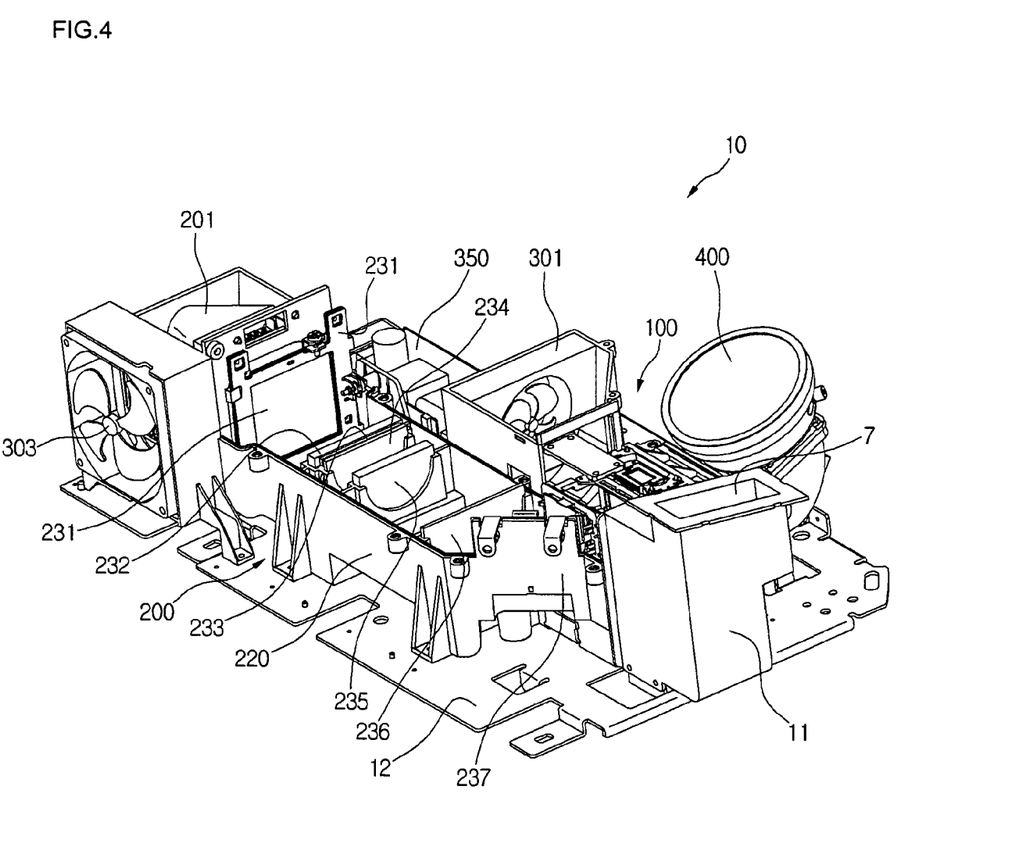
FIG. 4 is a perspective view of the optical engine whose a cover is removed.

FIG. 3 is a perspective view of the optical engine of the projection system according to the present invention and FIG. 4 is a perspective view of the optical engine whose a cover is removed. A construction and an operation of the optical engine will be described in detail with reference to the FIGS. 3 and 4.

The optical engine 10 includes an engine base 12 which forms a lower surface of the optical engine 10 and a lot of parts which are put on an upper surface of the engine base 12. Specifically, the optical engine 10 includes an illumination unit 200 for irradiating and refracting light, a composition unit 100 for composing RGB three color images including an image signal by light illuminated by the illumination unit 200, and a projection lens 400 for projecting light composed in the composition unit 100.

Further, although not directly related to image forming, the optical engine 10 further includes a power supplier 350 for stably supplying power and fans 301 and 303 for cooling heat generated in the optical engine 10. At least an electronic stabilizer is formed at the power supplier 350 to stably supply power to a lamp 201 and the fans 301 and 303 forcibly flows air to properly cool the optical engine 10.

The above-mentioned construction will be described in detail.

First, the illumination unit 200 include a lamp 201 which operates as a light source, a first fly eye lens (FEL) 231 and a second FEL 232 which improve uniformity of illuminating light emitted from the lamp 201, a polarizing beam splitter (PBS) 233 which is arranged in the rear side of the second FEL 232, a plurality of lens 234, 235, and 236 which accurately projects light passed through each cell of the FEL 231 and 232 in a right position of a LCOS panel, and a folding mirror 237 which turns a traveling direction of the light source to face the composition unit 100.

Specifically, the PBS 233 is a device which converts all light including P-polarized light of illuminating light into S-polarized light and uses a plurality of a half-wave plates. The FELs 231 and 232 allow light to be incident in a right position of the PBS 233. The illuminating light includes the S-polarized light which has X axis wavelength and P-polarized light which has Y axis wavelength as a direction perpendicular to a light traveling direction, but the P-polarized light which is incident to the composition unit 100 is converted into S-polarized light by the PBS 233, whereby all light is incident to the composition unit 100 in S-polarized light state. Therefore, there is an advantage that a use efficiency of light is improved because the P-polarized light that may be removed is used.

Specifically, the folding mirror 237 is a device which turns by 90 degree a traveling direction of illuminating light to be incident light to the composition unit 100. It is preferably that a predetermined device for adjusting an incline angle of right and left/up and below/front and rear direction is provided to accurately control a light traveling direction.

Further, each part of the illumination unit 200 is provided in the engine case 220 fixed to the engine base 12, and after each part is put on the inside of the engine case 220, the cover 210 is covered to protect inside parts from external shock and prevent foreign substance from being injected into the inside of illumination unit 200. A penetration hole 211 is formed in a predetermined position of the cover 210 and discharges heat generated from inside space of the illumination unit 200 and each parts constituting the illumination unit 200 to the outside by natural convection. Although one penetration hole 211 is formed in the figure, a plurality of penetration holes 211 may be formed as needed. It is desirable that the penetration hole 211 is formed at the upper side near the PBS 233 so that high heat generated from the PBS 233 is raised by natural convection and discharged to the outside.

After the S-polarized light is incident to the composition unit, it is separated by the wavelength, and it is incident to each LCOS panel, and then reflected from the LCOS panel and composed at a state where the image signal is contained, and projected through the projection lens 400. The detail composition of the composition unit 100 will be explained in detail later.

The cooling system of the optical engine 10 is cooled will be described in detail.

The optical engine 10 includes two fans 301 and 303 for forcibly flowing air and a plurality of guides for guiding the flow of air by the fans 301 and 303. The cooling system of the optical engine will be described based on a flow order of air.

First, a cold air housed in a space between the screen 2 and the back cover 4, that is, a light projecting space through an air injection port 7, is injected to the optical engine 10 side. The air injection port 7 is formed at the cold air injection guide 11 that is fixed to a side wall of the composition unit 100. The cold air injection guide 11 injects air from the upper side through the air injection port 7, and turns a traveling direction of air to the composition unit 100 side, that is, to a side direction and injects air into a side direction of the composition unit 100. Air injected to the composition unit 100 cools off the heat of the inside of the composition unit 100, and then injected to the first fan 301.

A suction guide 302 is provided at the neighboring outside of the first fan 301 to smoothly discharge the air injected to the inside of the composition unit 100. Air ejected from the first fan 301 is ejected to the power supplier 350 and cools heat generated from the power supplier 350.

As can be seen from the structure, the cooling system by the first fan 301 allows a negative pressure provided from the first fan 301 to transmit to the composition unit 100 and the cold air injection guide 11, so that air of the light projecting space is suctioned through the opening portion 8 of the division plate side.

Further, the second fan 303 is provided at the side of the lamp 201 to cool the lamp 201. The second fan 303 injects air (including air ejected from the first fan 301) around the power supplier 350 to the lamp 201 side and then discharges to the rear side of the projection system 1.

As can seen from the structure, the first fan 301 and the second fan 303 are provided around a heat source and provide a suction force, so that cold air absorbing heat while passing through the heat source and is sucked to the fan 301 and 303 and discharged.

Figure 5:
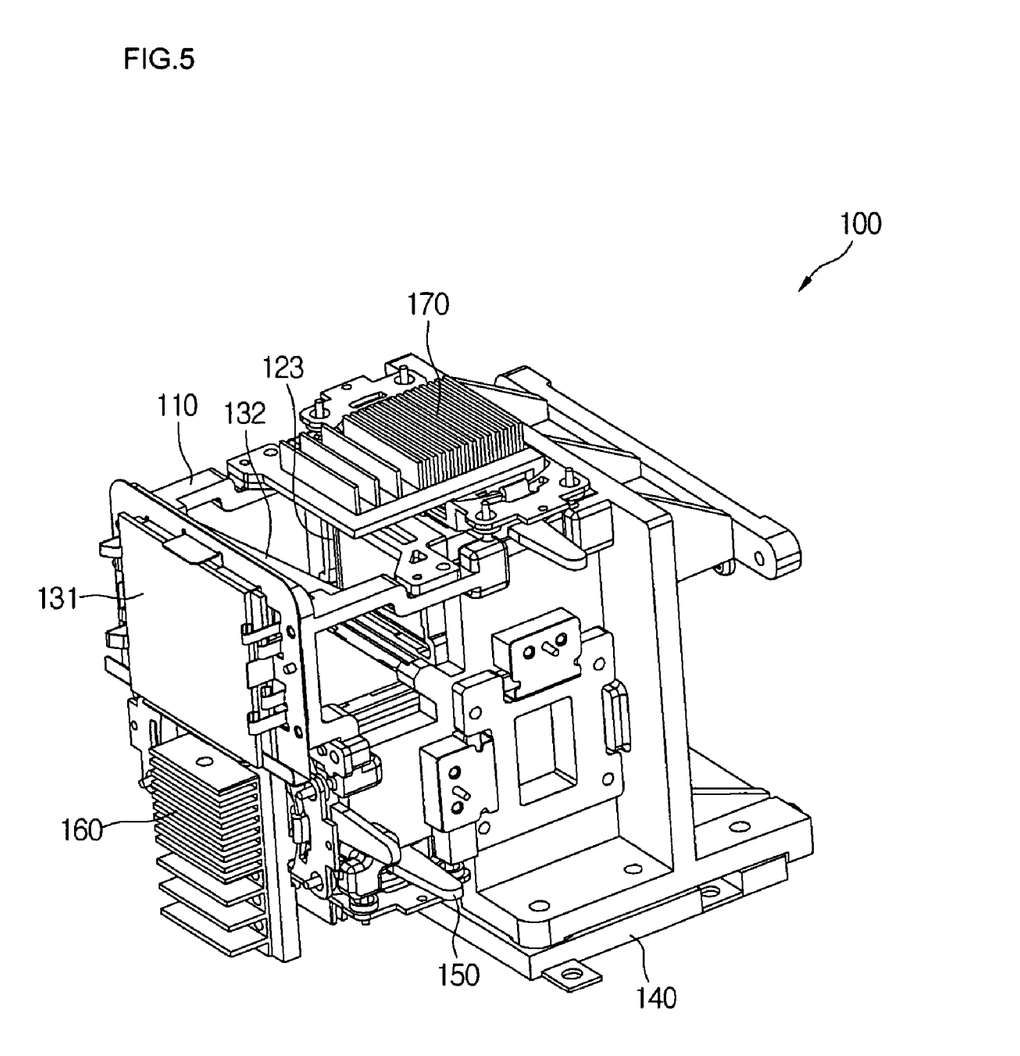
FIG. 5 is a perspective view of a composition unit manufactured as a single body.
Figure 6:
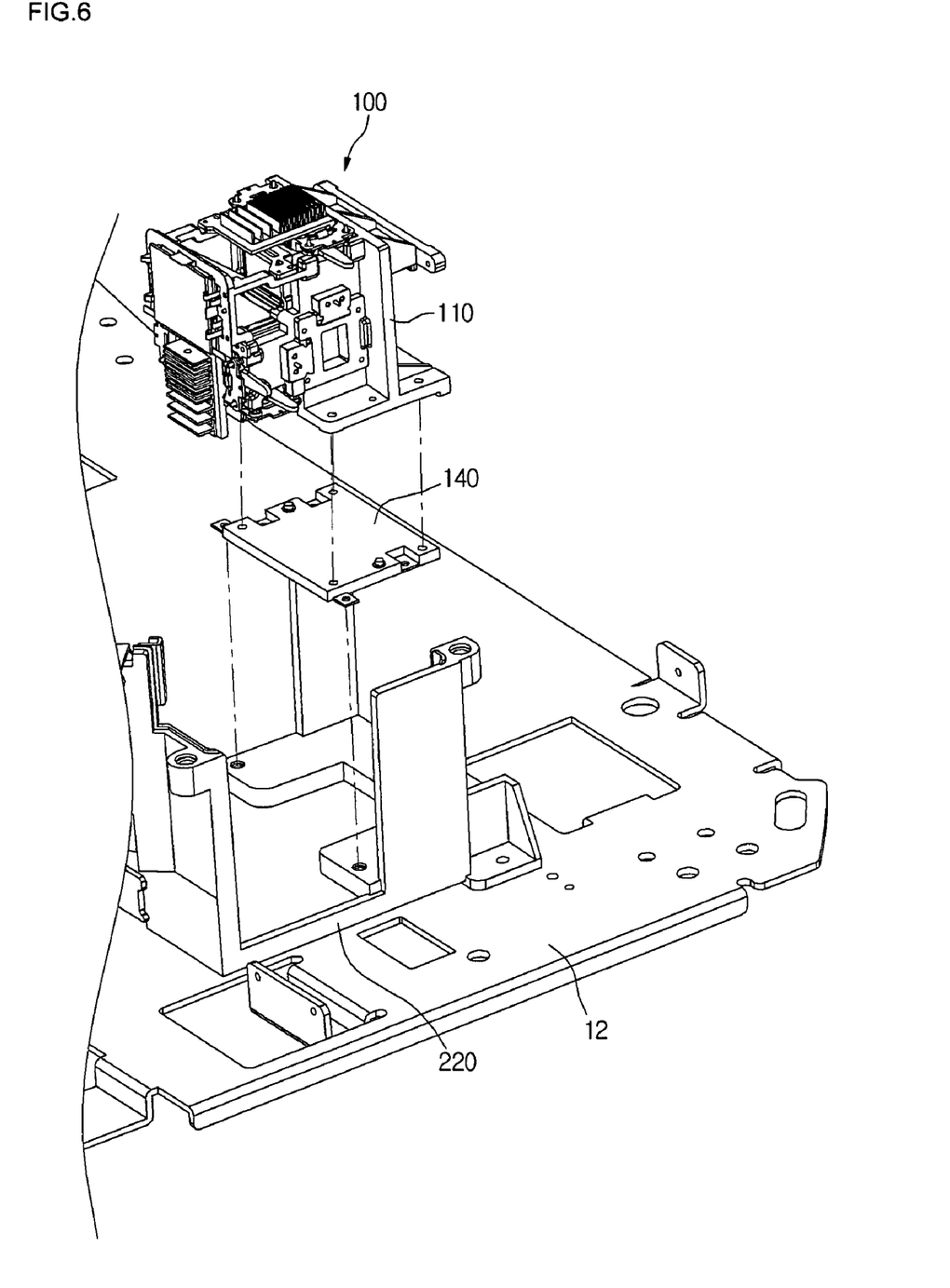
FIG. 6 is a view illustrating a coupled relation of the composition unit at a state where a quad housing and a reinforcing part are separated.
Figure 7:
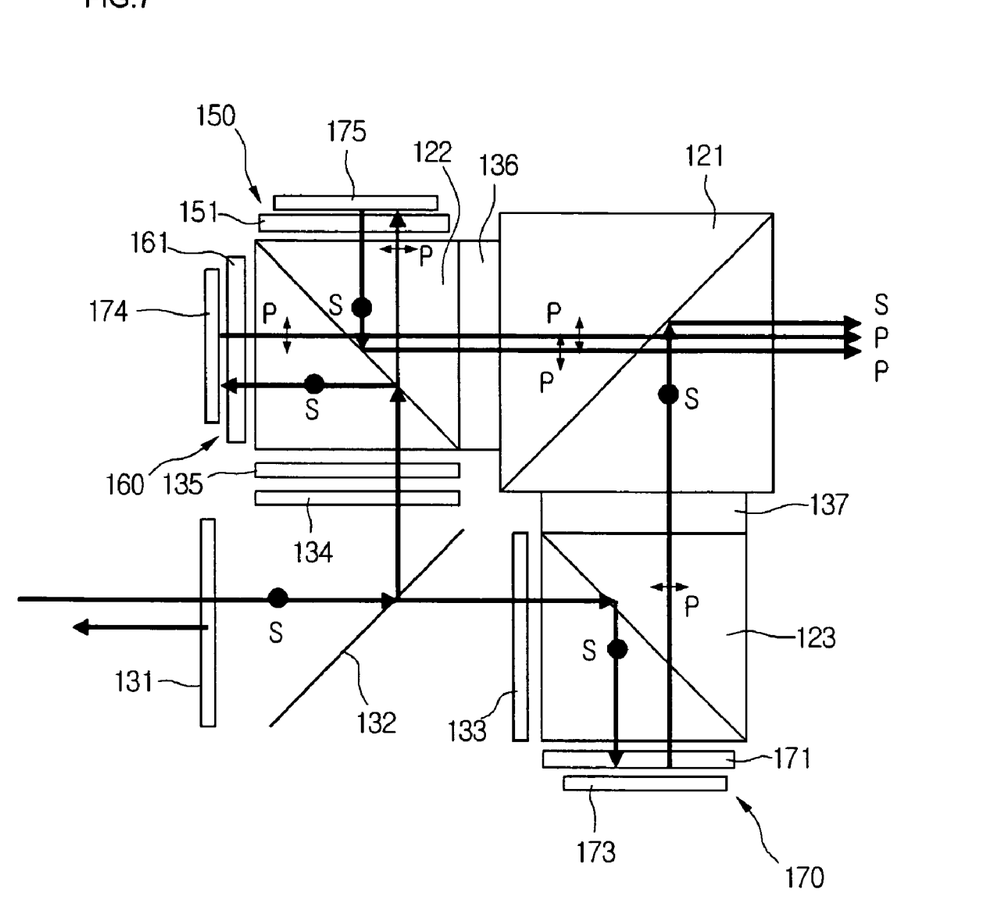
FIG. 7 is a view illustrating a structure and an operation of the composition unit.

FIG. 5 is a perspective view of the composition unit in the projection system according to the present invention, FIG. 6 is a perspective view of the composition unit at a state where a quad housing and a reinforcing part are separated, and FIG. 7 is a view illustrating a structure and an operation of the composition unit. A structure and an operation of the composition unit 100 will be described in detail with reference to the figures.

Referring to the FIG. 5, the composition unit 100 forms an image by separating and composing S-polarized light and is provided with a plurality of quads and a LCOS panel assembly.

Specifically, the composition unit 100 includes three quads 121, 122, and 123, a quad housing 110 which supports the quad, a single notch filter 131 which removes yellow color light which is not required for the S-polarized light, a dichroic mirror 132 which transmits blue color light and reflects red and green color light, and three LCOS panel assemblies 150, 160, and 170 which are a liquid crystal panel and fixed to the side of three quad 121, 122, and 123 to form RGB three color images. The LCOS panel assemblies are adjacently provided in the surface of the quad 121, 122, and 123 at a predetermined position of the quad housing 110 and allow light which is incident from the quad to be incident in an exact position of the LCOS panel.

Further, referring to FIG. 6, the quad housing 110 is made of magnesium to be strong and have excellent heat resistance. A reinforcing part 140 which is made of a high intensity material such as iron or aluminum which can reinforce intensity of the quad housing 110 is provided at the lower side of the quad housing 110 in a shape corresponding to the lower surface of the quad housing 110.

Further, an engine case 220 is positioned at the near lower side of the reinforcing part 140 and the engine base 12 is placed at the lower side of the engine case 220. The reinforcing part 140 may be fastened to the quad housing 110 by a fastening tool such as a screw at the upper side thereof and the engine case 220 by a fastening tool such as a screw at the lower side, and the engine case 220 may be fastened to the engine base 12.

As described above, since the reinforcing part 140 is made of a high intensity material, the external force is not transmitted to the quad housing 110 and further the composition unit 100 although external force is applied to the engine case 220 or the engine base 12.

Because the quad housing 110 is reinforced by the reinforcing part 140, deformation of the quad housing 110 by external force is prevented, and furthermore image matching between the LCOS panel assemblies 150, 160, and 170 fixed to the quad housing 110 is not deformed. In other words, at a state where three LCOS panel assemblies 150, 160, and 170 are coupled to the quad housing 110, after image matching of RGB three colors is made, non-matching of an image due to deformation of the quad housing 110 is not generated.

Furthermore, at a state where the lower part of the quad housing 110 is provided in the engine case 220, because external force deforming the engine case 220 and the engine base 12 is intercepted by the reinforcing part 140, external force is not transmitted to the other parts such as the quad housing 110 and three LCOS panel assemblies 150, 160, and 170. Therefore, at a state where three LCOS panel assemblies are fastened to the quad housing 110, if image matching is made once, external force is not applied to the quad housing 110 and supported by the reinforcing part 140 even during a process of fastening the quad housing 110 to the engine case 220.

On the other hand, when the composition unit 100 is coupled to the engine case 220, it is preferable that the reinforcing part 140 is fastened to the engine base 12 at a state where the reinforcing part 140 is fastened to the composition unit 100, but the composition unit 100 is not directly fastened to the engine case 220 to prevent deformation of the matched composition unit 100.

By such operation of the reinforcing part 140, there is an advantage that an operation can conveniently be performed. Specifically, a process of assembling the optical engine 10 will be explained in detail later.

On the other hand, a plurality of filters and the polarized light plate and the like which are not shown in FIGS. 5 and 6 may be also included. An operation of composition unit and an operation of such filters and the polarized light plate will be described with reference to FIG. 7.

Referring to FIG. 7, unnecessary yellow color light among the S-polarized light to be incident to the single notch filter 131 is removed by reflecting, and then the remaining light is incident to the dichroic mirror 132 so that blue color light is transmitted and red color light and green color light are reflected. Hereinafter, a light traveling progress will be described in detail in the order of blue color light, red color light, and green color light.

The S-polarized blue color light which transmits the dichroic mirror 132 passes through a second reflecting-type polarized light plate 133 to improve the purity of the S-polarized light. In other words, since the second reflecting-type polarized light plate 133 allows only light having the same direction as optical axis of the S-polarized blue color light to pass and filter out light having the optical axis of the other direction, the purity of the S-polarized light in illumination light is improved.

Thereafter, the light is reflected from the third quad 123 and is incident to a third LCOS panel assembly 170. The quad as beam splitter is operated to reflect the S-polarized light and transmit the P-polarized light.

Thereafter, the light is incident to a third quarter-wave plate 171 so that linear polarized light is converted to circular polarized light, and then the light is incident to the blue color LCOS panel 173 and the light including a blue color image is converted to the P-polarized blue color light and is reflected. Even though the P-polarized blue color light is incident to the third quad 123 once again, it just transmits the third quad 123 because it is the P-polarized blue color light.

Thereafter, the light is incident to a third birefringence polarized light plate 137 so that it is converted to the S-polarized blue color light by polarizing by a half wavelength and then incident to the first quad 121. The birefringence polarized light plate allows polarized light to be selectively generated and performs its function by the structure in which a birefringence material is differently arranged by the wavelength of light. Here, the third birefringence polarized light plate 137 is polarized by a half wavelength about the blue color light.

Thereafter, since the S-polarized blue color light which is incident to the first quad 121 is the S-polarized light, it is reflected from the first quad 121 and incident to the projection lens 400.

Further, the S-polarized red color light which is reflected from the dichroic mirror 132 passes through the first reflecting-type polarized light plate 134, and thus the purity of the S-polarized light is improved, and then the light is converted to the P-polarized red color light by passing through the first birefringence polarized light plate 135. The first birefringence polarized light plate 135 using a birefringence material polarizes red color light by a half wavelength.

Thereafter, the light is incident to the second quad 122. At this time, since the incident light is the P-polarized red color light, it just transmits the second quad 122, and then is incident to a first LCOS panel assembly 150.

Thereafter, after it is converted into circular polarized light by the first quarter wavelength plate 151, it is incident to a red LCOS panel 175 and the light including a red color image is converted to the S-polarized red color light and reflected, and it is reflected from the second quad 122 because it is the S-polarized red color light.

Thereafter, the light is incident to the second birefringence polarized light plate 136 so that it is converted to the P-polarized red color light by polarizing by a half wavelength, and it is incident to the first quad 121. Since the P-polarized red color light which is incident to the first quad 121 is the P-polarized light, it transmits the first quad 121 and proceeds to the projection lens 400.

Further, S-polarized green color light which is reflected from the dichroic mirror 132 passes through the first reflecting-type polarized light plate 134, and thus the purity of S-polarized light is improved, and then it just transmits the first birefringence polarized light plate 135. The first birefringence polarized light plate 135 using a birefringence material does not polarize green color light because it polarizes only the red color light by a half wavelength.

Thereafter, the light is incident to the second quad 122. At this time, since the incident light is the S-polarized green color light, it is reflected from the second quad 122, and then is incident to a second LCOS panel assembly 160.

Thereafter, after the light is converted into a circular polarized light by a second quarter wavelength plate 161, it is incident to a green color LCOS panel 174 and the light including a green color image is converted to the P-polarized red color light and is reflected, and it just transmits the second quad 122 because it is the P-polarized red color light.

Thereafter, it just transmits the second birefringence polarized light plate 136 and is incident to the first quad 121 as the P-polarized blue color light without polarization. The second birefringence polarized light plate 136 converts only red and blue color light by a half wavelength and does not polarize green color light. Since the P-polarized red color light which is incident to the first quad 121 is the P-polarized light, it transmits the first quad 121 and is incident to the projection lens 400.

As described above, red color light and green color light are incident to the projection lens 400 in a state of P-polarized light and blue color light is incident to the projection lens 400 in a state of S-polarized light. Thereafter, after projecting to the projection lens 400, the light is reflected from the reflective mirror 5 and displayed in the image on the screen 2. At this time, since a viewer watches the image at a state where he can not perceive whether light of the image is P-polarized light or S-polarized light, there is no problem in watching the image.

After three color light including three color images is composed, it is projected through the projection lens 400. If each light is not matched at an accurate position, the image is distorted or accurate color is not embodied. Therefore, a matching process for each LCOS panel is required.

The matching process for the LCOS panel can be performed by a process for generating matching by coinciding accurately a relative location where RGB three color LCOS panel assemblies provide in the quad housing and a process for exactly positioning the LCOS panel at the inside of the LCOS panel assembly.

The image matching should be maintained after the matching of the composition unit is performed. Hereinafter, a fabricating method of the optical engine which can achieve the object will be described.

Figure 8:
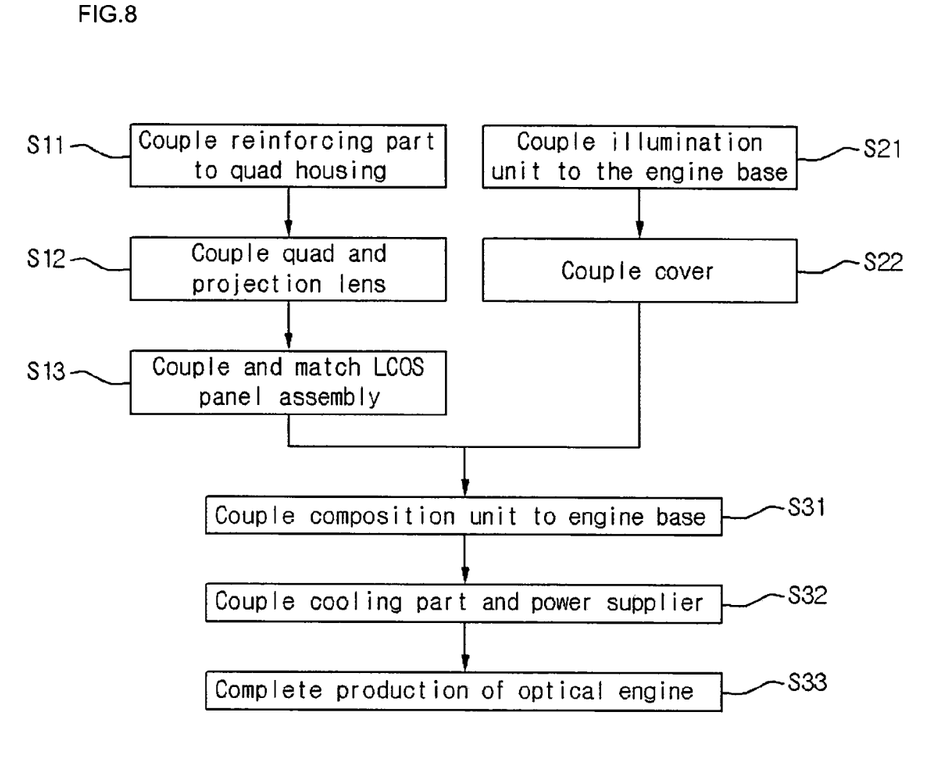
FIG. 8 is a flow chart illustrating a fabricating method of the optical engine of projection system according to the present invention.

FIG. 8 is a flow chart illustrating the fabricating method of the optical engine of the projection system according to the present invention.

Referring to the FIG. 8, a process of manufacturing the composition unit 100 will be described. First, the reinforcing part 140 is fastened to a lower part of the quad housing 110 which is provided in a single body (S11). This step can be performed by means of a fastening tool such as a screw as already described, the quad housing 110 is made of magnesium having excellent heat resistance, and the reinforcing part 140 may be also made of high intensity metal such as iron or aluminum having excellent strength. Further, a shape in which the quad housing 110 and the reinforcing part 140 is separated will be clearly understood by FIG. 6.

Thereafter, three quads 121, 122, and 123 operating as a beam splitter are fastened to the quad housing 110 and the projection lens 400 is fastened to the quad housing 110 (S12).

Thereafter, the LCOS panel assemblies 150, 160, and 170 are fixed to a position of the quad housing 110 and perform matching of RGB three color light (S13). If matching of RGB three color LCOS panel assemblies 150, 160, and 170 is made once, non-matching of an image is prevented and an effort for image matching is unnecessary since the intensity of the quad housing 110 is reinforced by the reinforcing part 140 and transmission of external force is intercepted.

On the other hand, an assembling process of the illumination unit 200 is performed independent of an assembling process of the composition unit 100. First, the lamp 201, the plurality of lens, and the filter constituting the illumination unit 200 are mounted to the engine case 220 at a state where the engine case 220 is fixed to the engine base 12 (S21). Then, the cover 210 covers the upper side of the illumination unit to protect an inside structure of the illumination unit 200 (S22).

The assembling process of the composition unit and the assembling process of the illumination unit is independently performed, and then a coupling process of the composition unit 100 and the illumination unit 200 is performed. Specifically, the composition unit 100 is provided in the engine case 220 and thus the illumination unit 200 is coupled to the composition unit 100 (S31). Specifically, in this process, the reinforcing part 140 is intervened between the composition unit 100 and the engine case 220. The reinforcing part 140 is made of a high intensity material and thus even while the composition unit 100 is mounted in the engine case 220, external force is not applied to the quad housing 110. In this way, since external force is intercepted by the reinforcing part 140 and not applied to the quad housing 110, non-matching of an image in the LCOS panel assemblies 150, 160, and 170 is not generated later.

Further, the reinforcing part 140 is not deformed and the engine base 12 is deformed even when deformation is generated because a contact surface of both parts is not parallel at a contact portion of the reinforcing part 140 and the engine case 220. Therefore, deformation is not generated at the quad housing 110 and non-matching of an image is not generated.

Thereafter, a cooling part such as fans 301 and 303 and a power supplier 350 are mounted (S32), and thus production of the optical engine is completed (S33).

Among several processes, because the image matching process (S13) is performed in advance a process in which the composition unit 100 is mounted on the engine base 12, it can be expected that external force is applied to the composition unit 100 during a fastening process. However, since external force which can be transmitted to the composition unit 100, specifically to the quad housing 110 by the reinforcing part 140 is intercepted, non-matching of an image is never generated. Therefore, an operator can continuously perform an assembling operation of the optical engine in more convenient.

For example, the reinforcing part 140 can be fastened by various fastening tools such as a hanger structure and a bonding structure without being fixed to the quad housing 110 and the engine case 220 by a fastening tool such as a screw.

Further, the composition unit 100 may be directly coupled to the engine base 12 without the engine case 220.

According to the present invention, after image matching of the LCOS panel assembly is once made, it is maintained semi-permanently, so that image deterioration is prevented.

Further, since the intensity of the quad housing constituting a frame of the composition unit is reinforced, non-matching of the composition unit is not generated although some degree of external force is applied thereto. Therefore, there is an advantage that an operator can perform an assembling operation of the optical engine more conveniently without a lot of efforts at a manufacturing site.

Further, since the intensity of the composition unit is reinforced and the image matching can be accurately maintained, normal use term of the projection system is prolonged and there is a strong point that the reliability at a product use is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical engine for a projection system, comprising:
   a lamp that irradiates light;
   an illumination device provided with a plurality of lens through which the light is passed;
   a composition device that separates and composes the light to form an image signal;
   an engine base provided with the illumination device and the composition device on a top portion thereof;
   an engine case disposed between the engine base and the reinforcing part, and configured to accommodate the composition device therein;
   a reinforcing part, which is made of a highly rigid material and one side of which is coupled to the composition device and the other side of which is coupled to the engine case to prevent deformation of the composition device; and
   a projection lens that projects light composed in the composition device to a screen, wherein the composition device comprises a quad, a quad housing to which the quad is coupled, and a LCOS panel assembly coupled to the quad housing, and wherein the reinforcing part is formed in a shape corresponding to a lower surface of the quad housing.

2. The optical engine according to claim 1, wherein the reinforcing part is made of metal.

3. The optical engine according to claim 1, wherein the reinforcing part is coupled to the quad housing.

4. The optical engine according to claim 1, wherein after the reinforcing part is coupled to the composition device, at least one of the quad and the LCOS panel assembly is coupled to the quad housing.

5. The optical engine according to claim 1, wherein after the reinforcing part is coupled to the composition device, image matching of the composition device is performed.

6. The optical engine according to claim 1, wherein the composition device is provided on the engine base by being coupled with the reinforcing part.

7. The optical engine according to claim 1, wherein the composition device is supported by not the engine base but the reinforcing part.

8. The optical engine according to claim 1, wherein the reinforcing part is coupled to the engine case.

9. The optical engine according to claim 1, wherein the reinforcing part comprises one of iron or aluminum.

10. A projection system comprising the optical engine according to claim 1.

11. An optical engine for a projection system, comprising:
    a lamp that irradiates light;

an illumination device provided with a plurality of lens through which the light is passed;

a composition device that composes the light reflected from a LCOS panel to form an image signal;

an engine case that houses the illumination device and the composition device;

an engine base provided with the engine case on a top surface thereof;

a reinforcing part, one side of which is coupled to the composition device and the other side of which is coupled to the engine case to prevent deformation of the composition device; and a projection lens that projects light composed in the composition device to a screen, wherein the reinforcing part is configured in a shape corresponding to a lower surface of the composition device, wherein the reinforcing part is made of metal, wherein the composition device comprises a quad, a quad housing to which the quad is coupled, and a LCOS panel assembly coupled to the quad housing, wherein the reinforcing part is formed in a shape corresponding to a lower surface of the quad housing, and wherein the engine case is positioned at a lower side of the reinforcing part and the engine base is positioned at a lower side of the engine case.

12. The optical engine according to claim 11, wherein a lower part of the composition device is supported by not the engine base but the reinforcing part.

13. The optical engine according to claim 11, wherein the reinforcing part is coupled to the composition device at an upper side thereof and to the engine case at a lower side thereof.

14. The optical engine according to claim 11, wherein the reinforcing part and the composition device are coupled to each other in a single body and ten coupled to the engine case.

15. A projection system comprising the optical engine according to claim 11.

16. A method of fabricating an optical engine for a projection system, the method comprising:

manufacturing a composition device by fixing one side of a reinforcing part to a quad housing; and fixing the other side of the reinforcing part to an engine base, wherein an illumination device is previously fixed with respect to the engine base, wherein after the reinforcing part is fastened, a LCOS panel assembly is fastened to a quad housing and image matching is performed, wherein the composition device comprises a quad, the quad housing to which the quad is coupled, and the LCOS panel assembly coupled to the quad housing, wherein the reinforcing part is formed in a shape corresponding to a lower surface of the quad housing, and wherein the reinforcing part is made of a highly rigid material.

17. The method according to claim 16, wherein the reinforcing part is coupled to a lower surface of the composition device.

18. The method according to claim 16, wherein the reinforcing part is abutted on the engine base side and a lower part of the composition device is abutted on the reinforcing part.

19. The method according to claim 16, wherein the reinforcing part comprises one of iron or aluminum.

20. An optical engine produced in accordance with die method of fabricating an optical engine for a projection system according to claim 16.

* * * * *